(12) United States Patent
Taylor et al.

(10) Patent No.: US 8,069,100 B2
(45) Date of Patent: Nov. 29, 2011

(54) METERED DELIVERY OF WIRELESS POWER

(75) Inventors: Joshua B. Taylor, Rockford, MI (US);
David W. Baarman, Fennville, MI (US);
Scott A. Mollema, Rockford, MI (US)

(73) Assignee: Access Business Group International LLC, Ada, MI (US)

( * ) Notice: Subject to any disclaimer, the term of this patent is extended or adjusted under 35 U.S.C. 154(b) by 340 days.

(21) Appl. No.: 12/349,355

(22) Filed: Jan. 6, 2009

(65) Prior Publication Data
US 2010/0174629 A1 Jul. 8, 2010

(51) Int. Cl.
*G07F 19/00* (2006.01)
(52) U.S. Cl. ........... 705/34; 705/39; 705/412; 320/132; 320/108; 455/573
(58) Field of Classification Search ............ 705/34, 705/39; 455/573; 320/132, 108
See application file for complete search history.

(56) References Cited

U.S. PATENT DOCUMENTS

| | | | |
|---|---|---|---|
| 6,436,299 B1 | 8/2002 | Baarman et al. | |
| 6,451,202 B1 | 9/2002 | Kuennen et al. | |
| 6,756,765 B2 | 6/2004 | Bruning | |
| 7,248,017 B2 * | 7/2007 | Cheng et al. | 320/108 |
| 2003/0034757 A1 * | 2/2003 | Woodnorth | 320/132 |
| 2004/0150934 A1 | 8/2004 | Baarman et al. | |
| 2006/0132045 A1 | 6/2006 | Baarman et al. | |
| 2006/0190728 A1 | 8/2006 | Veiseh et al. | |
| 2007/0029936 A1 | 2/2007 | Baarman et al. | |
| 2007/0042729 A1 | 2/2007 | Baarman et al. | |
| 2007/0145909 A1 | 6/2007 | Baarman et al. | |
| 2008/0001572 A9 | 1/2008 | Baarman et al. | |
| 2008/0010193 A1 * | 1/2008 | Rackley, III et al. | 705/39 |
| 2008/0079392 A1 | 4/2008 | Baarman et al. | |
| 2008/0088240 A1 | 4/2008 | Schwannecke et al. | |
| 2008/0136191 A1 | 6/2008 | Baarman et al. | |
| 2008/0157603 A1 | 7/2008 | Baarman et al. | |
| 2008/0164817 A1 | 7/2008 | Baarman et al. | |
| 2008/0231211 A1 | 9/2008 | Baarman et al. | |
| 2009/0156268 A1 | 6/2009 | Kim et al. | |
| 2009/0299918 A1 | 12/2009 | Cook et al. | |
| 2010/0201310 A1 | 8/2010 | Vorenkamp et al. | |
| 2010/0201313 A1 | 8/2010 | Vorenkamp et al. | |
| 2010/0201513 A1 | 8/2010 | Vorenkamp et al. | |

FOREIGN PATENT DOCUMENTS

EP 2 071 695 A2 4/2008

OTHER PUBLICATIONS

International Search Report and Written Opinion dated Mar. 1, 2010, PCT/US2009/069657.

* cited by examiner

*Primary Examiner* — Vanel Frenel
(74) *Attorney, Agent, or Firm* — Brinks Hofer Gilson & Lione

(57) ABSTRACT

A system is disclosed for charging or billing for access to wireless power. The device requiring power communicates with the power provider and the billing method is determined. A consumer may be required to provide billing information, or if the billing information is already associated with an existing account, the consumer account is automatically charged for the wireless power. The account may include prepaid charging minutes that are debited as wireless power is provided, or the account may be billed for the wireless power that is provided. The charging/billing for the wireless power may be used to receive value for the power that is provided, while remaining consumer friendly.

26 Claims, 11 Drawing Sheets

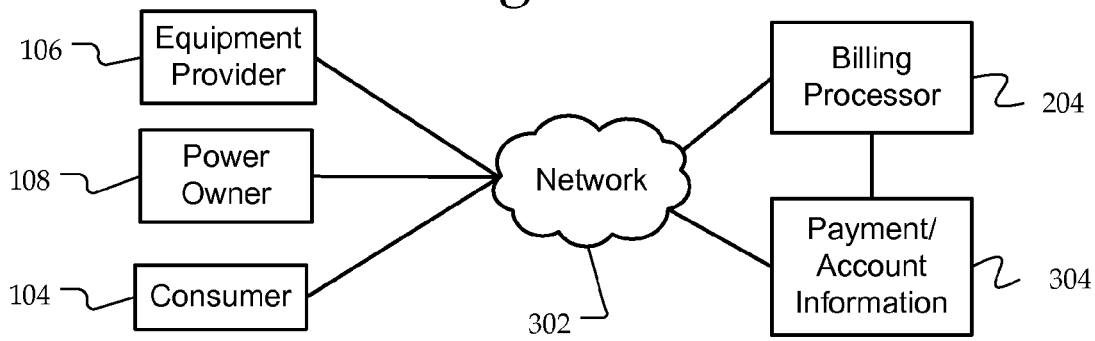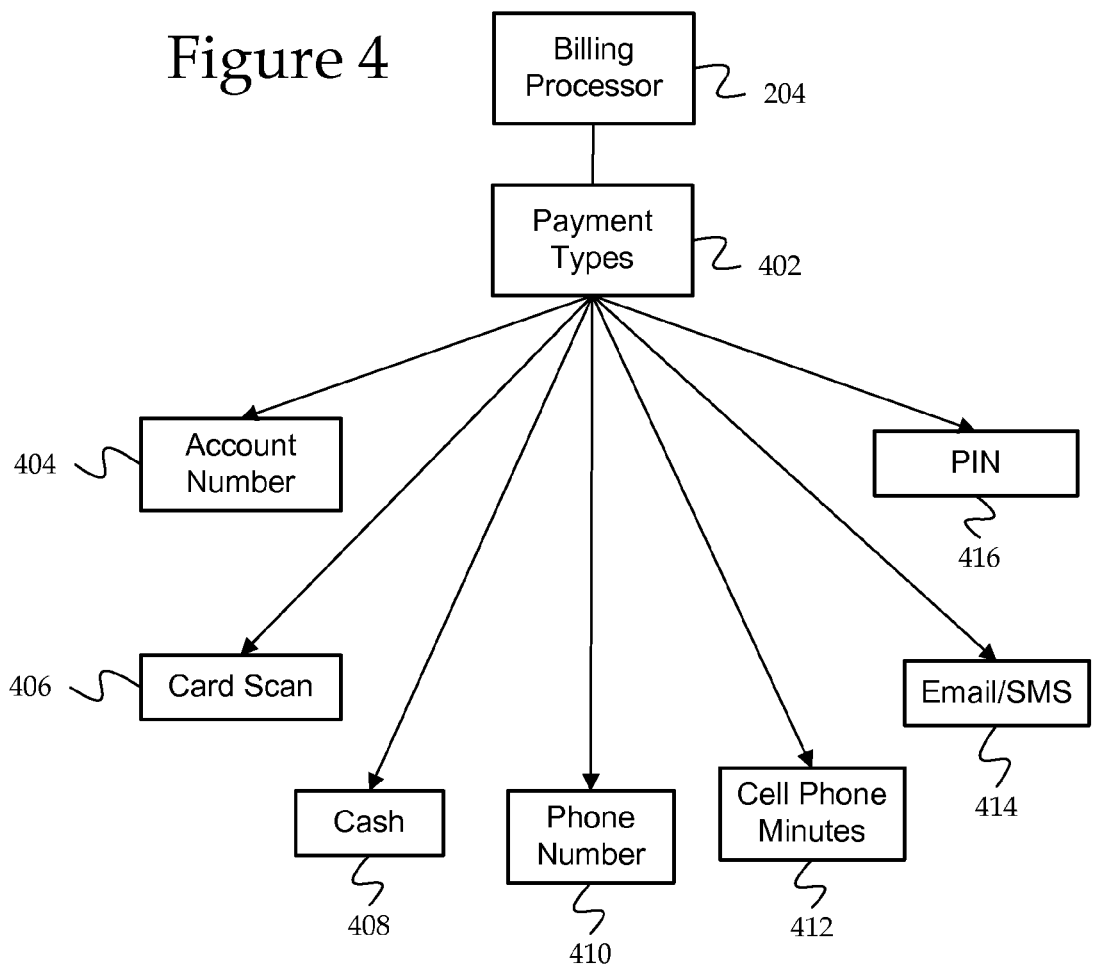

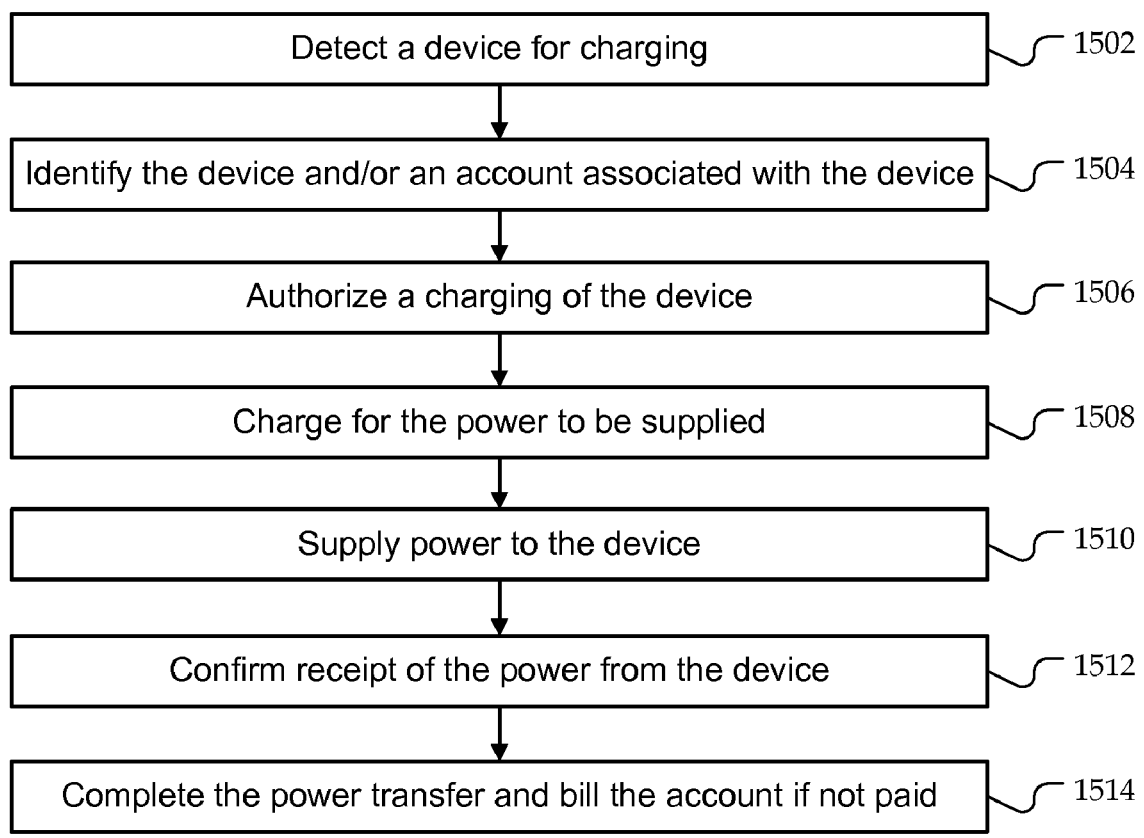

METERED DELIVERY OF WIRELESS POWER

BACKGROUND

There is a significant and continually increasing need for widely available power, particularly in the field of consumer and business electronics, due to the proliferation of laptop computers, cell phones, music players, personal digital assistants and other self-powered rechargeable remote devices that require periodic charging. In many public places, power may not be readily available to the general public because of the need for a power outlet for a wired connection. In the past, squatters may have plugged their devices into any available outlet and used power from the owner of the outlet. As devices become more power hungry the availability of outlets and the need for more power have become more common. This is exaggerated by the number of devices and the volume of usage per person. Electric vehicle charging now uses standard outlets, which contribute to the power supply needs of the public. Outlet monitoring and power usage control may be necessary to fairly provide consumers with power while receiving compensation for the product (power) that is provided.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 3 illustrates a communications network for billing;
FIG. 4 illustrates billing and payment options;
FIG. 15 illustrates a process for wireless power transfer.

DETAILED DESCRIPTION

There is a significant and continually increasing interest in wireless power supply systems to satisfy the consumers' needs for convenient power access. Wireless power supply systems provide a variety of benefits over conventional wired connections. Most notably, they eliminate the need for various charging cords and the need to repeatedly plug in and unplug electronic devices for recharging, thereby reducing cost and improving ease and convenience of use. Publicly available wireless charging may be very convenient and useful for consumers; however, the power provider, e.g. either the utility, the owner of the space, or both, may want to charge or bill the consumer for the power that is provided.

By way of introduction, the disclosed embodiments relate to automated metering of, e.g. charging or billing for, access to wireless power. The device requiring power communicates with the power provider and the billing method is determined. A consumer may be required to provide billing/account information, or the billing/account information may have been previously associated with an existing account or associated with the device requiring power, thereby allowing the consumer to be automatically charged for the wireless power. The account may include a prepaid allotment, such as an allotment of prepaid charging minutes, that is debited as wireless power is provided, or the account may be billed for the wireless power that is provided. The metering of power delivery may be provided so as to receive value for the electrical charge or power that is provided, while remaining consumer friendly.

Figure 1:
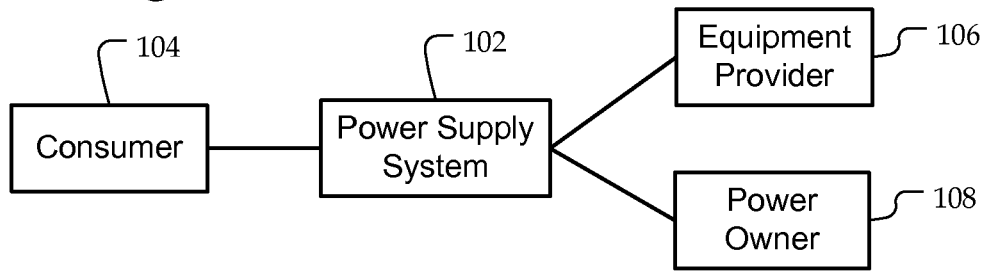
FIG. 1 illustrates a charging system.

FIG. 1 illustrates a wireless charging system 100. The charging system includes at least one consumer 104 accessing a power supply system 102. The power supply system 102 may provide wireless power to the consumer 104 in exchange for a payment. The power supply system 102 may be provided, maintained, and/or controlled by an equipment provider 106, such as the owner or manager of a public or limited public space, and/or a power owner or supplier 108, such as an electrical utility. The consumer 104 may have a device, such as a cellular phone or laptop computer, that includes a battery that must be recharged or that requires a power supply for operation. It will be appreciated that the disclosed embodiments may be used to supply power to non-battery operated devices which require delivery of operating electrical power at the time of operation. Throughout this disclosure the term charge may be used to include providing power for recharging a battery as well as providing or delivering power for reasons other than charging a battery, such as powering the device. The power supply system 102 provides the consumer's 104 device with power to charge or otherwise operate the device. As described, the power or energy may be in the form of an electric current (AC or DC) that is passed from an electrical outlet or supply terminal to the consumer's device.

The power supply system 102 may provide power wirelessly to the consumer 104. The power may be provided through induction that generates an electrical current at the consumer's device that charges the device. Wireless power transfer is further described in commonly owned U.S. Pat. Pub. No. 2008/0231211, entitled "POWER SUPPLY," which is hereby incorporated by reference.

The power supply system 102 may be located at a location owned by the power owner 108. In one embodiment, the power owner may be a supplier of the electricity, such as an infrastructure owner who provides power through the power supply system 102. The power owner 108 may utilize the equipment provider 106 for providing power to the consumer 104, but also to receive payment for that power. The equipment provider 106 may be the manufacturer of products, such as furniture, that are manufactured with the power supply system 102 built in. For example, airport seating, airplane seating, desks, auditoriums, or kiosks may be manufactured to include the power supply system 102. Since the power owner 108 may want to account for or recoup the expense for the power it provides to others, it may seek to utilize equipment from equipment providers that have the power supply system 102, as a way to provide power and receive payment for it. The equipment provider 106 may control and maintain the power supply system 102 under an agreement with the power owner 108, or the power owner 108 may control and maintain the power supply system 102. In one example, the power owner 108 may include the equipment provider 106 as a single entity.

Figure 2:
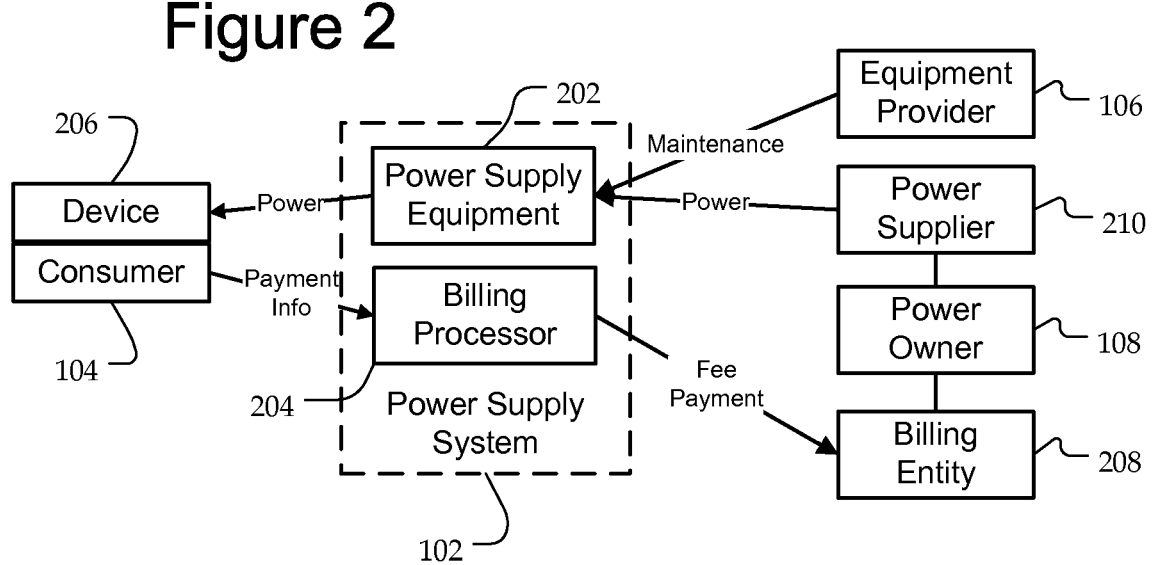
FIG. 2 illustrates an alternative charging system.

FIG. 2 illustrates an alternative charging system 200. The alternative charging system 200 includes a device 206 used by the consumer 104 that needs to be charged. The power supply system 102 includes power supply equipment 202 and a billing processor 204. As in the charging system 100 from FIG. 1, the device 206 owned or controlled by the consumer 104 may require a charge. The device 206 may be an electronic device with a battery, and the battery requires a power source for recharging. Alternatively, the device 206 may require a power source to directly power the device rather than, or in addition to, charging a battery. The device 206 may include a cellular telephone, a Smartphone, Blackberry®, personal digital assistant (PDA), notebook/laptop computer, netbook, portable multimedia player (playing video/audio files, Blu-Ray, DVDs, CDs, etc.), video game player (e.g. Gameboy®, Playstation Portable®), mp3 player, iPod®, or any other device that may utilize a charge or power source.

The device 206 may be configured to interact with the power supply system 102. In one example, the device 206 may include an adapter that receives wireless power from the power supply system 102, which may also include a corresponding adapter. The adapter of the power supply system 102 may connect with a standard electrical outlet for receiving wired power, which is then transmitted wirelessly to the device 206. Alternatively, there may be a uniform adapter that provides power to a number of different devices. For example, the uniform adapter may include multiple plugs that fit different devices for providing charge upon receiving power wirelessly. The wireless power transfer and adapter may be further described in U.S. Pat. Pub. No. 2004/0150934, entitled "ADAPTER," which is hereby incorporated by reference. The consumer 104 may seek a power source to charge or power the device 206, such as at a public location (e.g. an airport, library, or mall).

The power supply system 102 may be designed to provide power for charging or powering of the consumer's device 206, while receiving a payment for the charge or power that is provided. A billing entity 208 may be coupled with the billing processor 204 for receiving and processing the payment. The billing entity 208 may be a part of or separate from any of the power supplier 210, the power owner 108, or the equipment provider 106. The payment may be a price-per-minute of charge, or may be based on the actual amount of power or electricity provided to the device, such as the number of watt-hours delivered, and may be pre-paid or paid as used. The power supply system 102 may include the power supply equipment 202 which provides the power to the device 206. The power supply equipment 202 may include an interface which accesses, via wires or wirelessly, the power at a particular location (presumably owned by the power owner 108) and provided by a power supplier 210, which is then sold to consumers. The power supplier 210 may provide the wireless power, while the power owner 108 may be the owner of a location from which the power is provided. As described herein, the power owner 108 may also be the power supplier 210. In an alternative embodiment, the power supply system 102 may further include a detector that identifies the device 206. The detector may be a part of the power supply equipment 202, or may be a separate component that provides the identity of the device 206 and/or the consumer 104 to the billing processor 204.

As described below, the power supply equipment 202 provides wireless power to the device 206. The wireless power is transmitted to the device 206, after the billing processor 204 receives an acknowledgement of some form of payment from the consumer 104 and/or from the device 206. There may be an acknowledgement of the amount of the fee by the consumer 104, or an acknowledgement of the consumer 104 and an associated account, or an acknowledgement that payment was made and/or received. The consumer 104 provides payment information to the billing processor 204, which provides a fee payment to the billing entity 208 for use of the power supply equipment 202. The fee or payment that is provide for the wireless power supply may also be referred to as a compensation. The billing entity 208 may be a service that is provided for and controlled by one of the equipment provider 106, the power supplier 210, and/or the power owner 108. In one embodiment, the power owner 108 may purchase the power supply equipment 202 from the equipment provider 106 for a one time payment, and the equipment provider 106 may not receive additional fee payments for the use of the power supply equipment 202. Alternatively, the billing entity 208 may provide the fees received to the equipment provider 106, the power supplier 210, and/or the power owner 108.

In one embodiment, the power supply system 102 may be a kiosk or other device that is accessible by consumers. The power owner 108 may be the location where the kiosk is placed, such as a shopping mall, airport, hotel, amusement park, or other location. The kiosk may be operated by a billing entity 208 that collects payment from the consumers that receive power from the kiosk. The equipment provider 106 may be the manufacturer of the kiosk that is provided for placement at the location of the power owner 108. The power supplier 210 may be the power owner 108, or may be a utility company such as an electric company that provides electricity to the power owner 108. The power suppler 210 and the power owner 108 will be described below as being the same entity. In another embodiment, a series of wireless power stations may be established to blanket an area with wireless power. For example, the food court area of a shopping mall may include multiple power stations such that anyone with a device at the food court would have access to the wireless power.

FIG. 3 illustrates a communications network for billing. The billing processor 204 communicates with the consumer 104, the equipment provider 106, and/or the power owner 108 regarding the billing for charging the device 206. The consumer 104 (or the consumer's device 206), equipment provider 106, and power owner 108 may all be connected with the billing processor 204 through a network 302. The network 302 may connect any of the components to enable communication of data and may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network 302 may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network 302 may include any communication method or employ any form of machine-readable media for communicating information from one device or entity to another. For example, the consumer 104 may submit a payment over the network 302 to the billing processor 204. The billing processor 204 may be coupled with additional networks for submitting the payment, such as a credit/debit/ATM card authorization network.

Payment and/or account information 304 may also be accessed over the network 302. For example, the consumer 104 may be able to access account information 304 to monitor the amount, in terms of minutes or actual usage, of charge used over a certain period of time. The payment and/or account information 304 may also include information about the consumer 104 that is accessible by the equipment provider 106 and/or the power owner 108. For example, the payment and/or account information 304 may include customer demographics, devices owned, payment processing data, credit card or other account information, telephone number, or other information related to the consumer 104 and/or the device 206. The payment and/or account information 304 may be used by the billing processor for completing a transaction in which the consumer 104 provides a payment and receives access to a power source for his/her device 206. The payment and/or account information 304 may include an account that represents an amount of charge that is available. For example, the consumer may prepay for a certain number of minutes of charge and the account will include that number of minutes, which will be decremented as the device is charged. Additional minutes may be purchased and added to the account, or the account may track the charge amount and the consumer will be billed for that amount. The purchased minutes or time may be referred to as billing minutes or charging minutes and may be a different unit of time than minutes.

A website may be established for maintaining the payment/account information 304 for the consumer 104, the equipment provider 106 and/or the power owner 108. The website may provide an interface for the billing processor 204 through which the consumer 104 establishes and monitors a charging account. The power owner 108 may monitor the number of consumers that access and pay for any given power supply equipment. Alternatively, an interactive voice response system may be used to permit customer access via the telephone or through the use of SMS text messages for confirmation.

FIG. 4 illustrates billing and payment options for the consumer 104. In particular, the billing processor 204 may provide multiple payment types 402 for a consumer 104 to purchase access to charging or power from the power supply system 102. An account number 404 may be established for each consumer 104 and/or each device 206. The account number 404 may be associated with a balance that may or may not be prepaid. For example, the consumer 104 may purchase minutes of charge to the account number 404. The minutes of charge may represent the time for which the device 206 may be charged. For example, the consumer 104 may purchase one hour of charging time for $10, so if the consumer 104 adds $40 to the account number 404, then the consumer 104 will have 4 hours of charging time available. Accordingly, each consumer may have an account number 404 that represents a prepaid account that will be debited based on the amount of charging time. Alternatively, an amount of charge may be purchased that may vary based on the needs of the device to be charged. Charging minutes may be sold for the device as a time package or as a pay-as-you-go expense. The charge minutes may be monitored with a software package and software certificate via the internet.

As discussed above with respect to the payment/account information 304, the account associated with the account number 404 may be accessible from a website. In particular, a central website may manage the collection of payments for electricity and service charges. The website may be an interface that allows the consumer 104 to refill the value of the account. For example, the consumer 104 may access his/her account online and add $10 or one hour of charge time to the account. The addition of funds may be from a funding account, such as a checking or savings account, a credit card, a debit card, an ATM card, an online payment service (e.g. Paypal®), or other funding method. In one embodiment, the account may be linked with one of the funding accounts, such that the account balance may be automatically reloaded when the account value is depleted or when it drops below a threshold, such as $10. In addition, the power owner 108 and/or the equipment provider 106 may also be able access the website and monitor access to the power supply systems, including power usage and payment information. As described below, the consumer's device may be recognized by the power supply system and the associated account number 404 may then be identified and debited for the amount of power or the time the device is charged.

In addition to an account number 404 for each consumer, the billing processor 204 may also process credit cards, debit cards, or gift cards with a card scan 406 for consumers that may not set up an account, but still would like access to the wireless power. The consumer 104 may be able to pay at the power supply system 102 by providing a card for paying for the charges. The payment may be prepaid (e.g. $10 for one hour), or after the charging has completed, the consumer may pay based on how long the device charged. The account may include downloading the purchased minutes onto the device. For example, a cell phone user may purchase additional minutes over the cellular network and those minutes are stored (or encoded) on the device. Likewise, a laptop may download minutes, such as over a WiFi or other connection, and when the device is charging, those minutes are deducted. The power supply system 102 may include a coin or dollar bill slot for paying cash 408 for a charge or paying cash to purchase additional minutes for a consumer or device.

The consumer's phone number 410 may also be used for payment. In one embodiment, the phone number 410 may be associated with the consumer's account number 404 or may be the account number 404. The phone number 410 may be used to debit cell phone minutes 412 as a form of payment. For example, a charge of a cellular phone may be paid for with the cell phone minutes 412 or with other minutes purchased and associated with the account number 404. The cell phone provider may be associated with the equipment provider 106 and/or power owner 108 for agreeing on a compensation plan in which the consumer loses cell phone minutes 412, and the cell phone provider pays the equipment provider 106 and/or power owner 108 based on the number of minutes spent for a charge. The charging may be registered and metered through the phone number 410, or through a cellular service, Bluetooth, Wi-Fi, NFC, or any other wireless link. The charging minutes may be purchased and charged to your phone number 410 or account 404 and then are decremented as the time is used.

Email or short messaging service (SMS) messages 414 may also be used for payment. For example, a consumer may provide either an email or a phone number for SMS and the billing processor may confirm the consumer's identity by submitting a code by email or text (SMS) message. The code can then be used to access the wireless charge. Accordingly, email or SMS may be used for user and/or payment verification. The email and/or text message may include a PIN 416 number as described below. Alternatively, the consumer may need to affirmatively reply to the email or SMS message for verification.

A personal identification number (PIN) 416 may be used for securely leaving the device 206 at the power supply system 102. The PIN 416 may be a code that is entered upon leaving the device 206 and must be entered for retrieval of the device 206. For example, the power supply system 102 may include a number of individual lockers or other mechanism to secure the device, that may individually charge devices. Upon receipt of payment (or an account number 404 or phone number 410), the consumer enters the PIN 416 and the device is locked in the locker. To retrieve the device, the consumer enters the PIN 416 as described with respect to FIG. 8.

Figure 5:
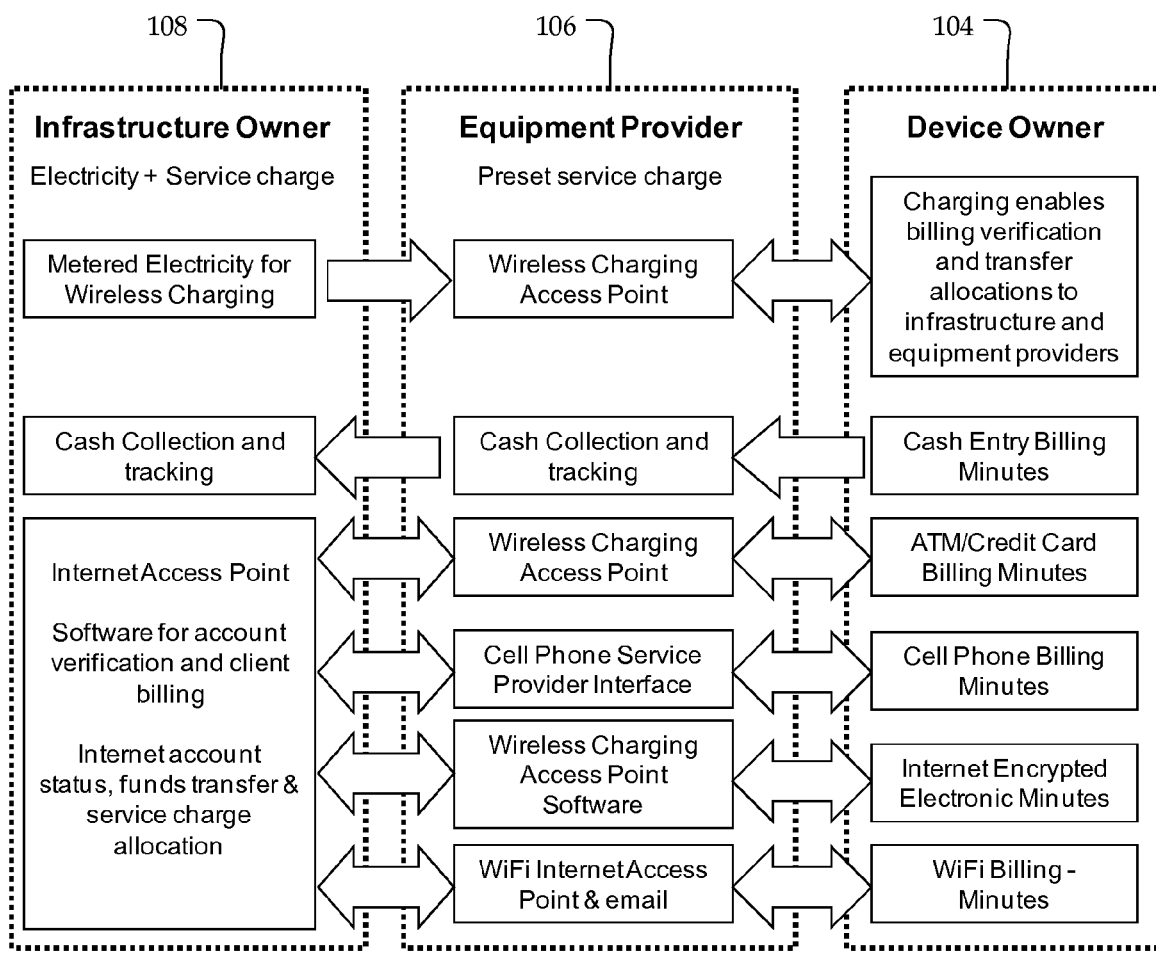
FIG. 5 illustrates interactions in billing for providing a charge.

FIG. 5 illustrates interactions in billing for providing a charge. In particular, FIG. 5 illustrates further billing options between the device owner or consumer 104, the equipment provider 106, and/or the infrastructure or power owner 108. The consumer 104 may access a wireless charging access point from the equipment provider 106, for which the power owner 108 is paid for the electricity provided for the wireless charge. The consumer 104 may utilize cash entry billing minutes, ATM/credit card billing minutes, cell phone billing minutes, internet encrypted electronic minutes, and/or Wi-Fi billing minutes. The consumer 104 may have an account in which billing minutes are purchased with any of these mechanisms. The billing minutes may be associated with the consumer 104 and/or a particular device. The billing minutes may represent charge time, or an amount of power/electricity provided for the charge.

The equipment provider 106 may include cash collection and tracking for the receipt of cash, credit card processing for a credit card or other card payment, or a cell phone interface for billing the charge time to the consumer's cell phone bill. The charge time may result in a deduction of cell phone minutes, or may include an additional charge on the cell phone bill. In such an embodiment, the equipment provider 106 may be a cell phone company, such as Verizon®. Verizon® may provide a wireless power supply system in which Verizon® users may charge their cell phones with the billing being added to the cell phone bill. Alternatively, the cell phone user may purchase billing minutes that are downloaded to the cell phone and deducted as the phone charges. A website or other software interface may be utilized for access and tracking of a consumer's billing minutes as described above. In addition, email notifications may be used for identifying the status of billing minutes for a consumer.

The power owner 108 may also provide cash collection and tracking of the use of power. The electricity provided by the power owner 108 may be monitored along with the payments that are received for the provided electricity through the website or other software interface. The power owner 108 may monitor the payments received for each location compared with the cost of the electricity that is being provided. Accordingly, the power owner 108 may target different locations to maximize usage of the power supply systems.

An encryption and decryption system may be used to encode the billing minutes at the device, then verify and decrement the minutes using the code provided by the source which can also be verified and synchronized using web or cell phone access. A security code (which may be a rolling code), a user ID, and minutes may be tracked by the source and verified using the internet. This may be used to provide proper transfer of payment to the proper power owner and the equipment provider depending on the business structure that drives the installation of the infrastructure.

Referring back to FIG. 2, the power supply equipment 202 may be coupled with a billing processor 202 for receiving and verifying payment. Alternatively, the power supply equipment 202 may automatically recognize the device 206 and/or the consumer 104 and the consumer 104 may be automatically billed. The consumer's account may be automatically debited based on the length of time of the charging. In one example, an armrest for certain seats may be equipped for wireless charging and when a device is placed on the armrest, the device may start charging automatically if the power supply does not require a payment. Multiple payment types were described with respect to FIG. 4, but another alternative may include automatic payment. The power supply equipment 202 may identify the device that is being charged. The identification may utilize the communication described in the U.S. patent application Ser. No. 12/652,053 entitled "WIRELESS CHARGING SYSTEM WITH DEVICE POWER COMPLIANCE" filed on Jan. 5, 2010, based on Provisional App. No. 61/142,663 filed on Jan. 6, 2009, and U.S. Pat. Pub. No. 2008/0157603, entitled "INDUCTIVE POWER SUPPLY WITH DEVICE IDENTIFICATION," both of which are hereby incorporated by reference.

Based on the device identification, the consumer and/or an account associated with that device may be identified for billing. For example, once the device is identified, then the account number that is associated with the device will automatically be debited for the time spent charging after the charging is completed. If the device is a cellular phone, then the phone's minutes may be automatically debited when it is disposed on a wireless charger that identifies the device.

Figure 6:
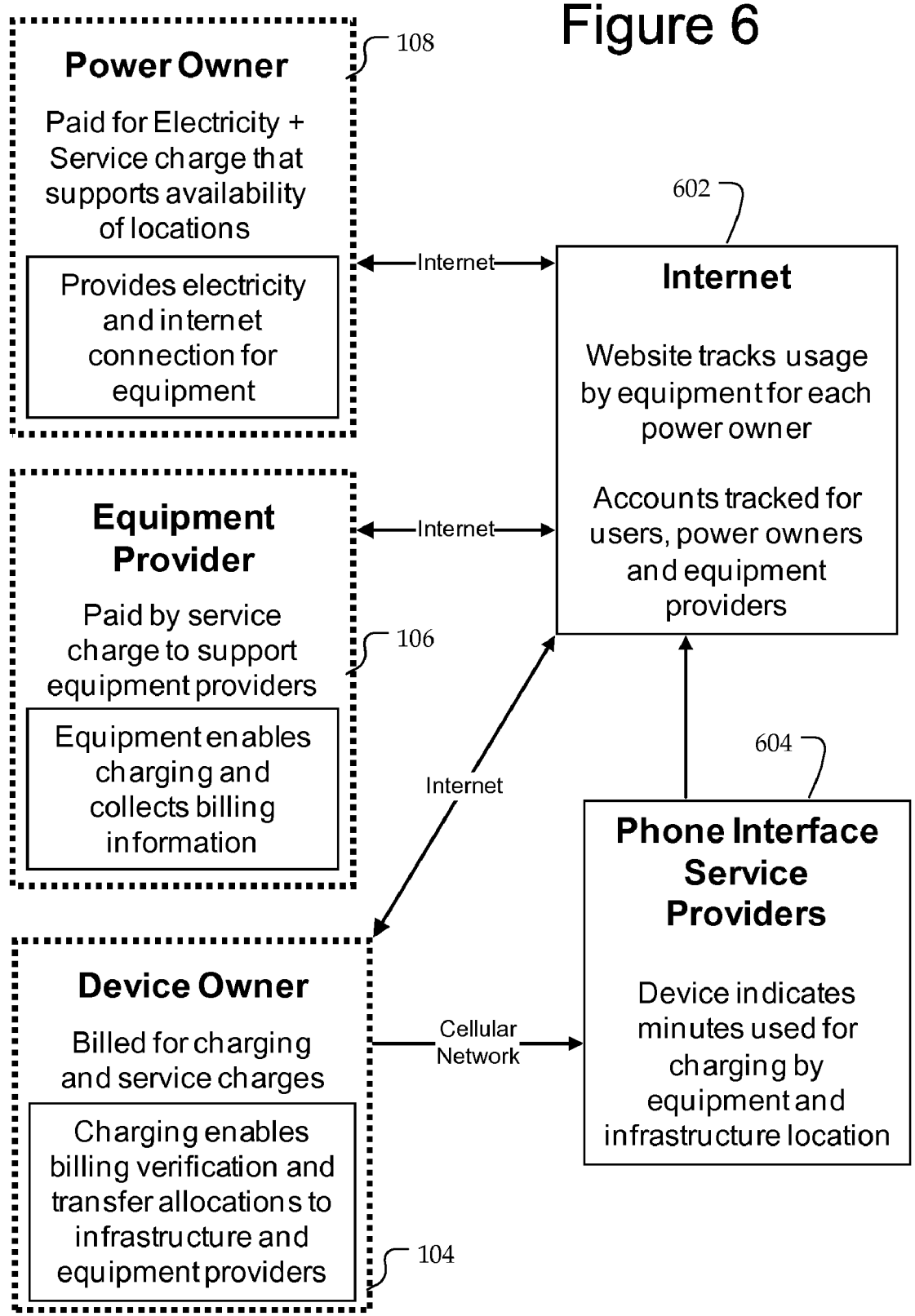
FIG. 6 illustrates an exemplary network system.

The automatic billing or debiting for a wireless charge may be controlled over a wireless network. In the cellular phone example, the wireless network may be the cellular network. Other protocols, such as Bluetooth, Wi-Fi, or Near Field Communication (NFC) technology may be used for connecting the charging system with account information for billing. FIG. 6 illustrates an exemplary network system. In particular, the device owner 104, equipment provider 106, and power owner 108 are each connected with the Internet 602. The connection with the Internet 302 may include a website that tracks usage by equipment for each power owner 108 and/or each equipment provider 106. The website also tracks usage by device for each device owner 104. Further, the Internet may be used for identifying the device and billing/debiting the appropriate account associated with that device. A phone interface 604 may be the wireless network associated with a cellular phone device. The phone interface 604 may be utilized by the device owner 104 for debiting minutes from the cell phone. The Internet 602 or the phone interface 604 may be utilized for automatic billing for a charge. Once the charge is initiated, the relevant device information is passed over the network and consumer account information is received in response. Once the charging is completed, the consumer's account information is updated to reflect the amount of the bill for the charging.

Although the charge system described herein is wireless, the billing techniques described throughout may also be used for a wired solution. In particular, cable or corded communications, as well as wireless communications, may be used to transfer the needed information to track, verify and bill accordingly. The power supply may include a cord that connects with the device rather than relying on induction for wirelessly transmitting power.

Figure 7:
FIG. 7 illustrates exemplary charging compartments.

FIG. 7 illustrates exemplary charging compartments or lockers 702. As shown in FIG. 7, there may be a series of lockers 702 that are each compartments for wirelessly charging a device. The lockers 702 may be pull-out drawers or have a door that swings open for placement of a device to be charged. The lockers 702 may be connected with an interface in which the consumer provides payment for the wireless charge. The interface may include a key pad, touch screen, card scanner, or cash receiver. The consumer may provide a form of payment, such as cash, card (credit, debit, or gift), account number, or phone number in order to access one of the lockers 702. In one embodiment, the PIN 416 is used to retrieve a device placed in one of the lockers. The PIN 416 may be entered into a key pad, keyboard, or touch screen interface. The PIN 416 may be entered by the consumer upon dropping the device off at the locker, such as a 4-digit number. Alternatively, the PIN 416 may be the account number 404 or phone number 410.

The lockers 702 may be located in a kiosk or other publicly accessible place. For example, high traffic public areas, such as shopping malls, subway stations, cruise ships, and airports, may provide the wireless power supply system for its consumers. If the consumer's cell phone needs charged, the consumer can utilize one of the lockers for a period of time to wirelessly charge the phone and then return after the period of time to pick up the phone. The lockers or compartments may be shielded to prevent fields from one locker affecting a device in another locker. As described, the lockers 702 may "lock" the device while charging, and may require a key for unlocking the device. In alternative embodiments, there may be lockers 702 that do not lock the devices and do not require a PIN 416. The consumer may leave the device at one of the lockers 702 temporarily and may stay near the locker to get a temporary charge. If a store or business provided a free wireless power supply system, it may not require locks for the lockers 702.

Figure 8:
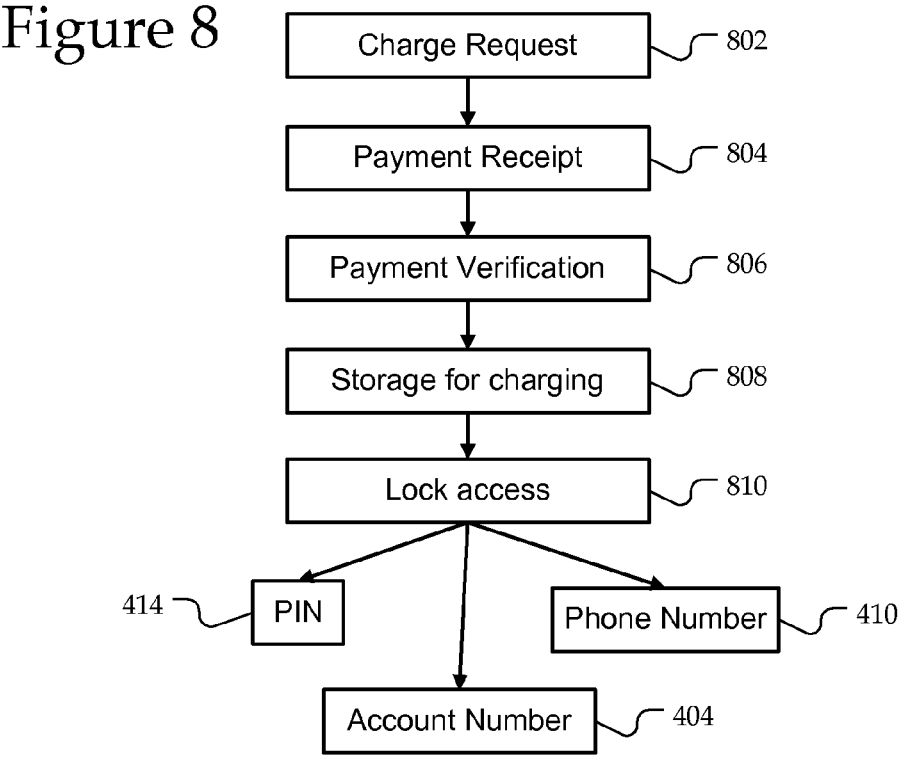
FIG. 8 illustrates an exemplary storage and charging process.

FIG. 8 illustrates an exemplary storage and charging process. In block 802, the consumer requests access to the power supply system 102 for charging a device. The access requested may be for one of the lockers 702. The request may include opening one of the lockers 702 or inputting payment according to one of the payment types 402. In block 804, the payment is received from the consumer. As discussed above, the payment may be through multiple payment types 402 and may be submitted through an interface. In block 806, the payment is verified depending on the payment type. For example, for an account number, the amount of credit associated with the account is determined and the consumer may be notified of the length of the time the charge may be available. If an account does not have enough credit, the consumer may be notified to add more money to the account. In block 808, the device is stored for charge. The lockers 702 may be used as individual compartments for wirelessly charging devices. In block 810, the devices may be locked to prevent access to the device by anyone other than the owner. In alternative embodiments, there may be no need for locking of the devices when the consumer is near the device, but in various public environments, the consumer may not want to be near the device for the entire charge time. In block 810, there may be multiple locking codes that are used, such as the PIN 416, the account number 404, and/or the phone number 410. The entry of one of these access codes allows the consumer to retrieve the charging device.

Figure 9:
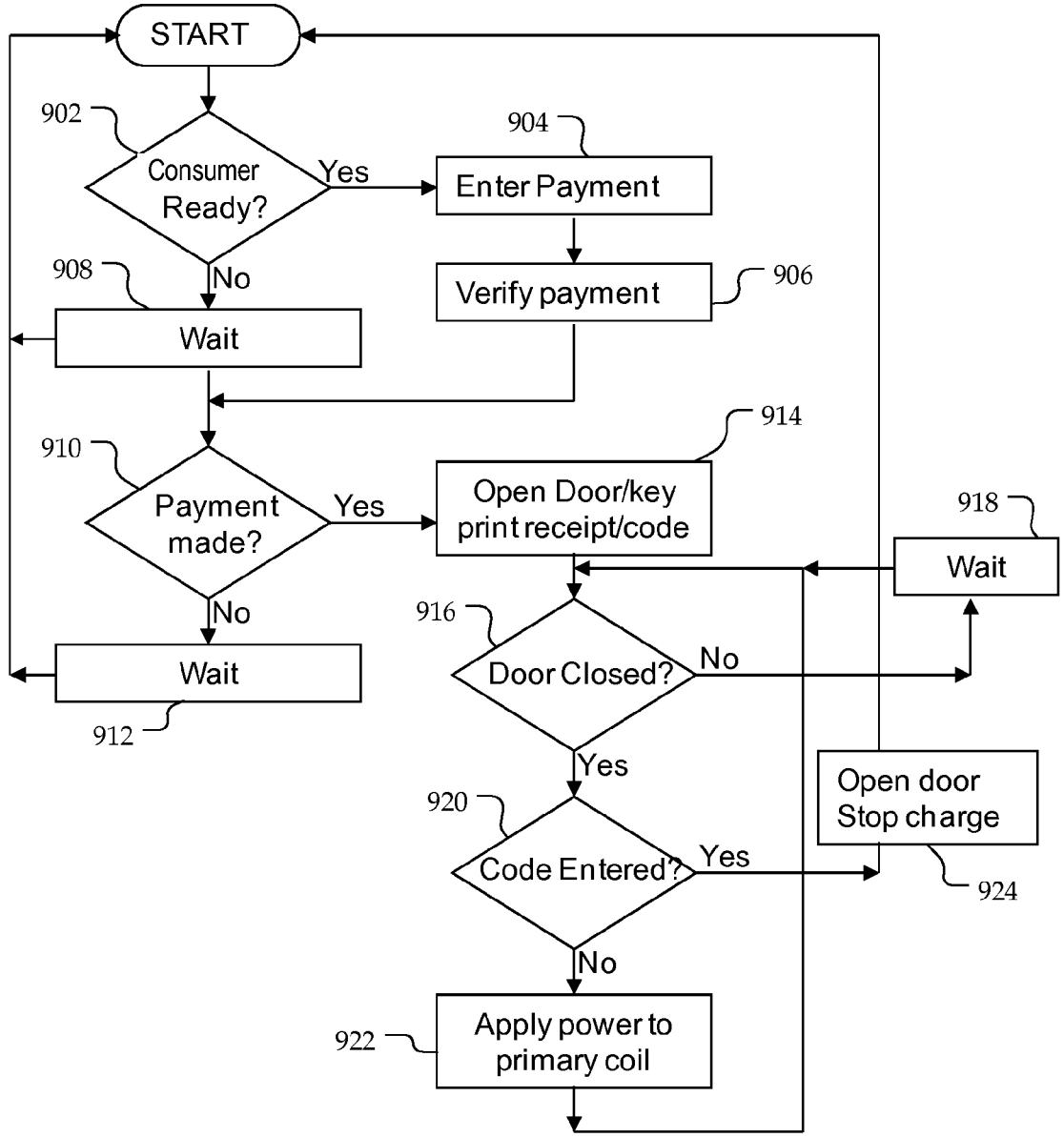
FIG. 9 illustrates an exemplary process for paying for a charge.

FIG. 9 illustrates an exemplary process for paying for a charge. In block 902, the power supply system 102 waits for a consumer to request a charge. When the consumer is ready in block 904, the consumer enters payment and the payment is verified in block 906. If the consumer was not ready in block 902, the system waits for the payment in block 908. When the payment is being verified in block 906, the system checks to see if payment was made in block 910, and if the payment was not made, the system waits in block 912 for the consumer to be ready and for payment to be verified. When payment is made in block 910, the door is opened for charging of the device in block 914. A receipt for the payment may also be printed that is a proof of purchase. The receipt may also include a code, such as the PIN 404 for accessing the charging device. In block 916, the door is open and the system waits for the door to be closed in block 918. When the door is closed in block 916, the system checks for the code in block 920. Until the code is entered in block 920, the power is wirelessly applied to the device for charging as in block 922. When the code is entered in block 920, the door is opened and the charging is stopped as in block 924.

Figure 10:
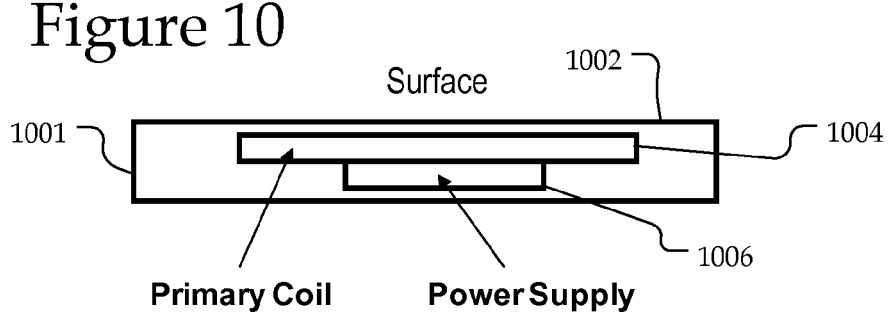
FIG. 10 illustrates an exemplary surface providing a wireless charge.

Referring back to FIG. 2, the power supply equipment 202 provides wireless power to the device 206. FIG. 10 illustrates an exemplary surface providing a wireless charge. The power supply equipment 202 may include a wireless charger 1001 with a surface 1002 that is adjacent a primary coil 1004 coupled with a power supply 1006. The power supply 1006 provides current to the primary coil 1004 for generating a magnetic field. When a device is disposed on or near the surface 1002, a charge is induced in a secondary coil in the device from the primary coil 1004. The wireless charger 1001 may be located in each of the lockers 702 illustrated in FIG. 7. In alternative embodiments, a single wireless charger 1001 may charge multiple devices. The power supply equipment 202 may include a single large wireless charger 1001 that charges multiple devices. The wireless charger 1001 may be located in auditorium seating, airport seating, train seating, airplane seating, fold down tables, or restaurant tables for providing a wireless charge. In particular, the wireless charger 1001 may be disposed in the armrest of one of the seats, such that the device is placed on or near the armrest surface for a wireless charge. Alternatively, other surfaces, such as a desktop, work surface, or table may also be equipped with the wireless charger 1001.

Figure 11:
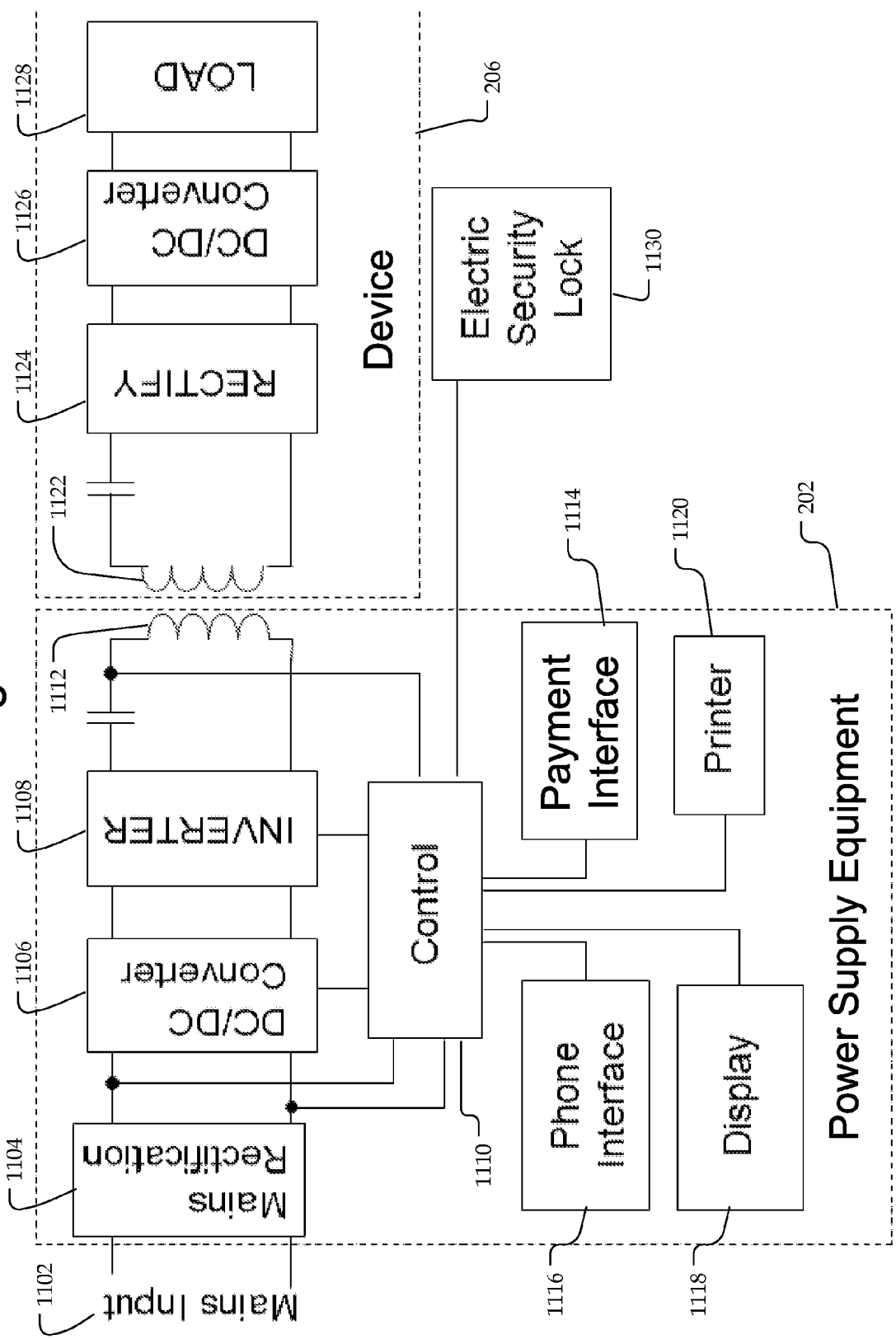
FIG. 11 illustrates a wireless power connection.

FIG. 11 illustrates a wireless power connection. Power from the power provider enters 1102 and is then rectified to DC by 1104. The power supply 1106 allows a variable power supply to alter the DC voltage required as selected by 1110. This information is passed from the device 206 through the wireless power link 1112. The capacitor adjacent to 1112 in the device 206 is optional depending on design considerations. Device limits, charge or power needs are transferred from the device 206 to the power supply equipment 202 using a simple control that varies the load 1128 by the device 206 control to allow detailed communications. This control may be the microprocessor located within the device and can switch an additional load or change the voltage level using 1126 to send information to the control 1110. Alternatively, the control 1110 may also alter the signal send through the wireless power link 1112 using the converter 1106 changing the voltage into the inverter 1108. A voltage or frequency input at 1122 or 1124 to the device 206 microprocessor control may allow this information to be decoded. Wireless power charging is further described in U.S. Pat. Pub. No. 2008/0079392, entitled "SYSTEM AND METHOD FOR INDUCTIVELY CHARGING A BATTERY," and U.S. Pat. Pub. No. 2007/0042729, entitled "INDUCTIVE POWER SUPPLY, REMOTE DEVICE POWERED BY INDUCTIVE POWER SUPPLY AND METHOD FOR OPERATING SAME," both of which are hereby incorporated by reference.

FIG. 11 shows the power supply equipment 202 inductively coupled with the device 206. In one embodiment, the device 206 is charged inductively by the power supply equipment 202. The power supply equipment 202 may include the wireless charger 1001 described with respect to FIG. 10. The power supply equipment 202 may receive main inputs 1102 of power. The power may be paid for by the power owner 108. The main input is rectified 1104 before going through a DC/DC converter 1106 and an inverter 1108. A control 1110 controls the incoming power and regulates the primary coil 1112. As described above with respect to FIG. 2, the billing processor 204 may be a separate component from the power supply equipment 202. Alternatively, the power supply equipment 202 may include a payment interface 1114 for receiving the payment from the consumer. The power supply equipment 202 may further include a phone interface 1116 for coupling with a cellular network. The phone interface 1116 may debit a consumer's minutes for charging of a cell phone device. A display 1118 may display for the consumer the elapsed time of the charging along with the current cost. Additional device and/or account information may be shown on the display 1118 to the consumer. A printer 1120 may print out a receipt for bill payment and/or print out a code (such as a PIN) for retrieving a charging device.

The device 206 may include a secondary coil 1122 disposed adjacent or near the primary coil 1112 for generating a current that passes through a rectifier 1124 and a DC/DC converter 1126. The wireless inductive transfer between the power supply equipment 202 and the device 206 feeds a load 1128 that is charged by the power supply equipment 202. As discussed above with respect to the lockers 702 in FIG. 7, an electric security lock 1130 may secure the device 206 to prevent access except for the device owner. The electric security lock 1130 may require a code, PIN, or other identifying material for access to the device.

Figure 12:
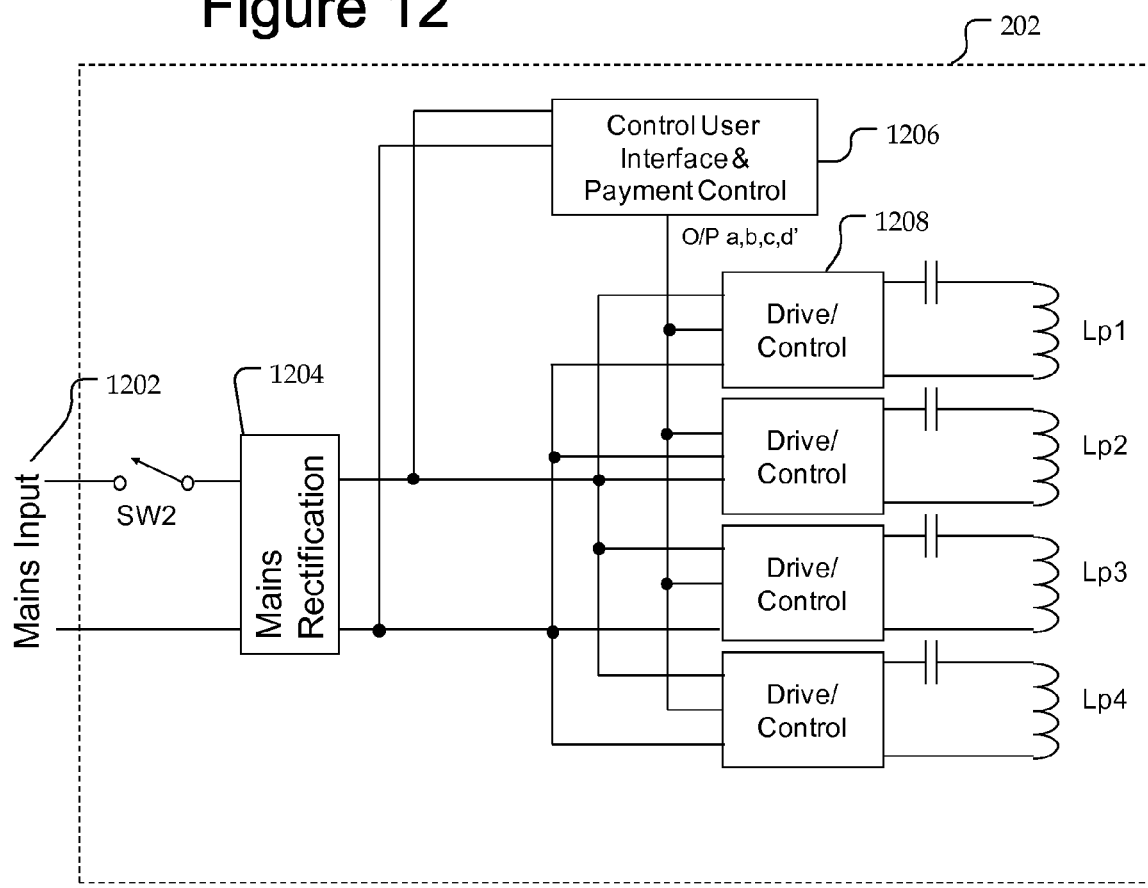
FIG. 12 illustrates alternative wireless power supply equipment.

FIG. 12 illustrates alternative wireless power supply equipment 202. The components in the power supply equipment 202 may be similar to the power unit illustrated in FIG. 11. The device 202 may include a control that powers four wireless power devices with one controller 1206. This system may be easily scaled to as many units as required for an installation by adding drive controls 1208 as system speed allows or adding parallel systems as required. The main input 1202 is received and passed through a rectifier 1204. A control user interface 1206 may monitor/control the charging that is provided by the coils Lp1, Lp2, Lp3, and Lp4. Each of the coils may be coupled with a separate drive/control 1208 that pass current through the coils. The power supply equipment 202 illustrated in FIG. 12 may configured to charge multiple devices simultaneously with the plurality of coils. The controller 1206 multiplexes monitoring each of the drive controls 1208. The drive control to the coil Lpx is handled by each drive control 1208 respectively, in order to share processing requirements. The controller 1206 may maintain communications and basic power parameters for each of the controls 1208 while the controller 1206 drive controls each coil Lp1-Lp4 respectively.

Figure 13:
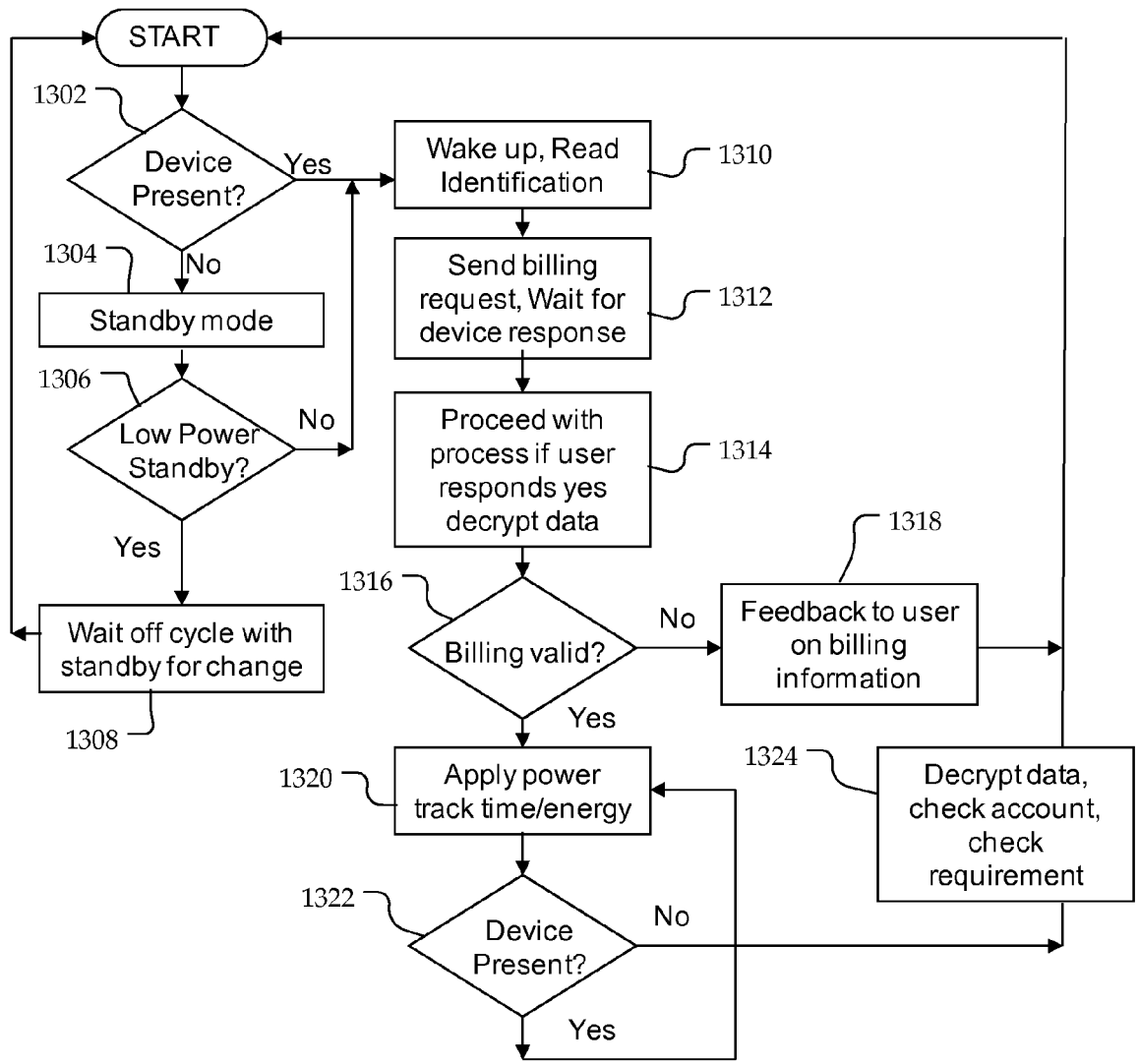
FIG. 13 illustrates a power supplying process.

FIG. 13 illustrates a power supplying process. The process illustrated in FIG. 13 may be performed by the power supply system 102. The system checks whether a device is present in block 1302. The device may be detected using a mechanical or electronic sensor, or through the use of a RFID chip. If no device is present, then the system is in standby mode in block 1304. The system then decides whether it is in low power standby in block 1306. When in lower power standby, the system waits off cycle with a standby for a change in block 1308. When not in low power standby in block 1306, or when a device is present in block 1302, the system is woken and identification is read in block 1310. The identification identifies the device and/or the device owner. In block 1312, a billing request is submitted to the device and the system waits for the device response to the billing request. In block 1314, the system waits for the device to affirm the billing request in order to proceed with the process and decrypting billing data. In block 1316, the billing validity is determined. If the billing is not valid, then the device is informed of the problem with the billing in block 1318. In one embodiment, there may be a minimum threshold of minutes that are required before the consumer can begin charging. For example, if the consumer has fewer than 10 charging minutes the consumer may be requested to add additional payment as part of the feedback to the user in block 1318. When the billing is valid in block 1316, the power is applied to the device and the time and/or energy is tracked in block 1320. The billing may be based on an amount of time that is charged or based on an amount of energy that is provided. The energy is applied to the device and the time and/or energy is tracked in block 1320 as long as the device is present in block 1322. When the device is removed in block 1322, the billing data is decrypted for charging/billing the device owner. In one embodiment, the time and/or energy may be tracked by a set unit of time, such as every minute. After each of the time intervals, the device sends a certificate for another time unit of charge. In response, the device may need to verify the ID of the device and validate the certificate request.

Figure 14:
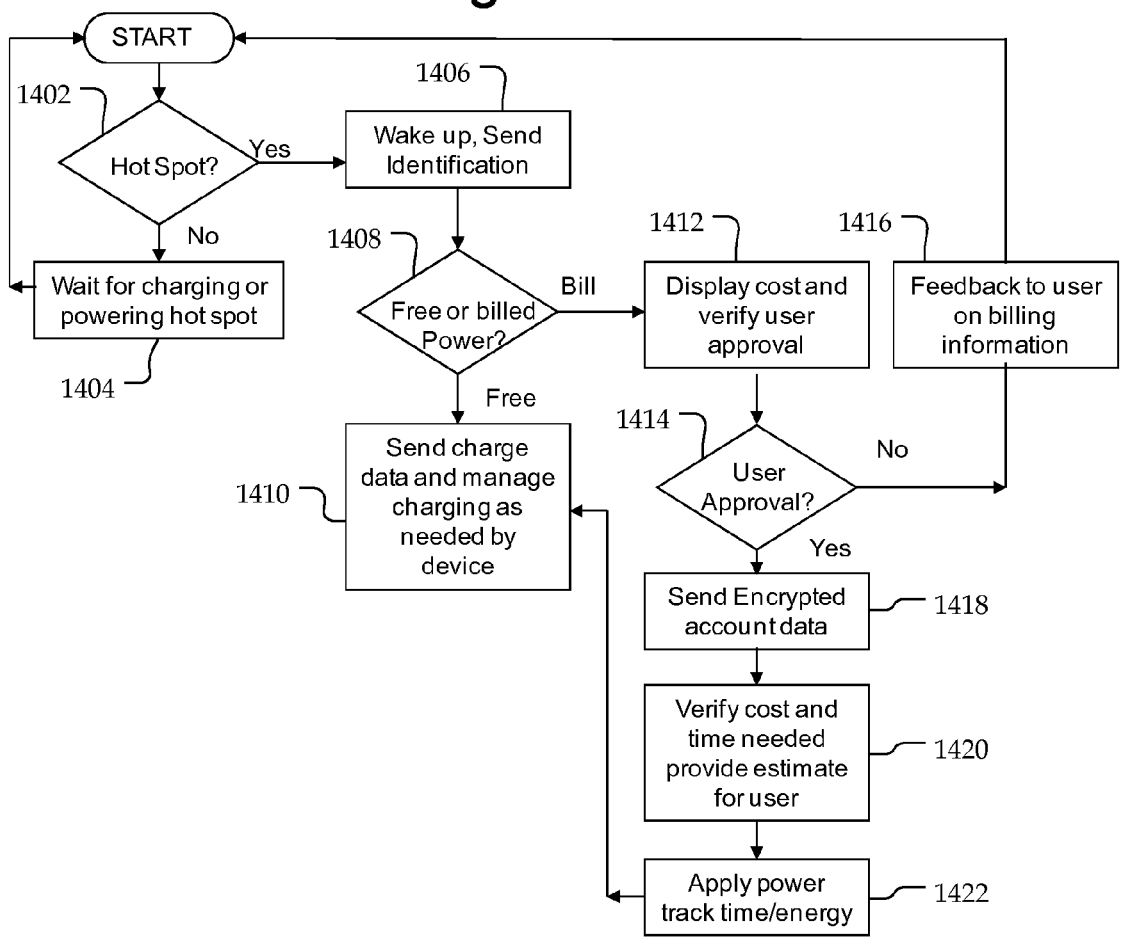
FIG. 14 illustrates a power receiving process.

FIG. 14 illustrates a power receiving process. The process illustrated in FIG. 14 may be performed by the device 206 and the consumer 104 or device owner. In block 1402, the device determines whether it is located in a hot spot with wireless charging. In block 1404, the device waits for a hot spot to be identified for wireless charging. In block 1406, when the device is located near a hot spot, the device is woken and identification of the device is provided to the hot spot. The hot spot may include the power supply system 102. A determination is made by the device as to whether the wireless power provider is free or requires a fee as in block 1408. When the power is free the charge data is sent to the provider and the charging is managed by the device in block 1410. When the charger requires a fee, the cost is displayed in block 1412. In block 1414, the consumer and device are approved. When the consumer and/or device are not approved in block 1414, feedback is provided to the consumer regarding the billing information problems in block 1416. When the consumer is approved, encrypted account data is sent to the charge provider in block 1418. The consumer verifies the cost and time needed for charging in block 1420. In block 1422, the device is charged and the time and/or energy are tracked for billing.

As hybrid vehicles and electric cars become more common it is more important to be able to provide a charge to the battery that is driving the car. The vehicle may be the device 206 described above and may be the equipment that is manufactured to include the wireless power supply system 102. The locations for receiving a charge include the wireless power supply system may be a designated parking space or portion of the road that includes a wireless charger that can charge the vehicle when it is at that location. Alternatively, the vehicle may be powered by the wireless power that it receives rather than just charging a battery with the wireless power. A metered parking spot may include the wireless power supply below the spot, such that a consumer pays to park in that spot and the vehicle is charged by the power supply. Alternatively, a consumer may install the wireless power supply in a garage parking spot so that when the vehicle is parked in the garage, the vehicle battery may be charged. A section of road may include the wireless charging system, so that when the vehicle travels down that road, the battery is charged. In other words, there may be a power zone or hot spot that charges the vehicle as it passes over that zone/spot. The vehicle may be an electric car that is charged. Alternatively, a scooter or Segway may also be charged by the wireless power system.

FIG. 15 illustrates a process for wireless power transfer. In block 1502, a device is detected for charging. In one embodiment, the power supply system may receive a signal from a device seeking a charge. In one embodiment, when the device enters into a vicinity or proximity of the wireless power provider, the device may detect the wireless power. For example, a consumer with a cell phone may enter an area with a wireless power provider and the cell phone may detect the wireless power or the wireless power provider may detect the presence of the cell phone. In block 1504, the device may be identified by the power supply system. An account associated with the device and/or the consumer may also be identified. Each account may include one or more devices. The device and/or account may be identified based on a signal or communication between the power supply system and the device. The communication may be a SMS or email, or RFID may be used for identification. Once the device and/or the account have been identified, the billing for the wireless charging of the device may occur in block 1506. In one example, an account associated with the device may include prepaid funds that are used for paying for the wireless charge. Alternatively, the account may include a record of the wireless power provided that is then billed to the account, or charged to a funding account, such as a credit card as in block 1514 discussed below. Once the payment has been established the power is supplied to the device in block 1510. The device may confirm receipt of the wireless power in block 1512. For example, the device may communicate with the power supplier regarding the amount of charge delivered and/or received. The confirmation may be needed to confirm that the device is receiving the power that the supplier thinks is being delivered. The confirmation may be required for the charging/billing of the account of the device, otherwise, it may be possible the device did not receive the wireless power or another device was receiving the wireless power inadvertently.

The payment/billing for wireless power may be made before power delivery, during power deliver, or after power delivery. In block 1514, the account may be billed for the power received when there was not a prepayment. The payment may be debited from the account as the power is delivered, or may be based on time intervals, such as five minute intervals of time. For example, the consumer may purchase three five-minute intervals of charge. The amount may be paid up front with a timer controlling the delivery of power. If the device is removed before the time is up, the consumer may lose the extra charge time, or it may be added to the consumer's account. Alternatively, the billing may only be for the amount of power that is received. In another example, a device may be fully charged in less time than anticipated. Depending on the payment type, the consumer may lose the extra time that was paid for, or that time may be refunded.

In one embodiment, the wireless power may be transferred to a device automatically with limited or no user interaction. For example, when a consumer with his/her device enters into a wireless charge area, the device may automatically begin receiving wireless power after the device or account is identified and a form of payment is verified. The device may identify itself to the wireless charge system. The wireless charge area may include the range that the wireless power is available over. When the device is within range, it may automatically receive power until it is fully charged, at which time, it may stop receiving power. Alternatively, this automatic charging may request confirmation from the consumer on whether the device should be wirelessly charged. For example, an SMS communication/response or other validation may be required on the device or at a source of the wireless power in order to begin the wireless power transfer. The device may detect that it is within the wireless power range and provide a Yes/No option for the consumer to decide whether to receive wireless power to the device. The validation may also include the price that must be paid for the wireless power.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A wireless charging system comprising:
   a detector that automatically detects a presence of a device when within range and identifies the device to be powered;
   a billing processor coupled with the detector and operative to automatically authorize delivery of power to the device upon the detection and the identification;
   a power supply coupled with the billing processor operative to automatically wirelessly provide power to the device upon the authorization of delivery by the billing processor; and
   wherein the billing processor is further operative to account for the power provided to the device by the power supply to arrange for compensation therefore.

2. The wireless charging system of claim 1 wherein the device is associated with a charging account and the compensation comprises a payment from the charging account.

3. The wireless charging system of claim 2 further comprising a web interface for displaying information associated with the charging account including usage and payment data.

4. The wireless charging system of claim 2 wherein the billing processor is further operative to verify the charging account over a wireless network, including checking the information associated with the account over a Wi-Fi or cellular network.

5. The wireless charging system of claim 1 wherein the power is provided to the device at a surface of the power supply through induction, and further wherein the identification is received from the device through a wireless connection.

6. The wireless charging system of claim 1 wherein the power supply is disposed in an armrest of a chair and the device is charged when placed adjacent the armrest.

7. In a computer readable storage medium having stored therein data representing instructions executable by a programmed processor for billing for wireless charging, the storage medium comprising instructions operative for:
   providing, upon detection of a device, a prompt to the device for providing wireless charging;
   receiving a response to the prompt that comprises a request for a wireless charge from the device;
   identifying the device and an account associated with the device based on the received response, wherein the account includes a charging value;
   providing wireless power to the device when the received response comprises an acceptance of the billing; and
   modifying the charging value as the wireless power is provided to the device.

8. The computer readable storage medium of claim 7, wherein the charging value comprises a billing amount that is owed by an owner of the device for the receipt of the wireless power.

9. The computer readable storage medium of claim 7, wherein the charging value comprises a prepaid amount of at least one of charging minutes or an amount of electricity.

10. The computer readable storage medium of claim 9, wherein modifying the charging value comprises debiting the prepaid amount.

11. The computer readable storage medium of claim 10 further comprising requesting additional payment when the prepaid amount of charge is almost zero.

12. The computer readable storage medium of claim 7 further comprising:
    providing a payment rate required for the wireless charging; and
    requesting a validation regarding the payment rate before wireless power is provided to the device.

13. The computer readable storage medium of claim 7 wherein the response to the prompt is used to verify an identity of the device.

14. The computer readable storage medium of claim 13, wherein the prompt comprises a short messaging service (SMS) text message and the verification comprises:
    sending the short messaging service (SMS) text message to a phone number associated with the account; and
    receiving a confirmation SMS text message.

15. The computer readable storage medium of claim 14, wherein the original SMS text message comprises a personal identification number (PIN) that is used for locking the device during charging and unlocking the device after charging.

16. The computer readable storage medium of claim 13, wherein the verifying the identity of the device comprises:
    sending an email message to an address associated with the account; and
    receiving a confirmation email.

17. The computer readable storage medium of claim 13 wherein the providing wireless power to the device comprises:
    receiving the device in a locker, wherein the locker includes a surface with a primary coil; and
    inducing a current in a secondary coil of the device due to the inductance between the primary coil and the secondary coil.

18. The computer readable storage medium of claim 17 wherein the verification is required for access to the locker.

19. A method for providing a wireless charge comprising:
    storing account information that comprises an amount of charging minutes for each consumer;
    receiving a request for a wireless charge from a consumer;
    verifying an identity of the consumer and checking the amount of charging minutes for the consumer;
    requesting additional payment when the amount of charging minutes is below a threshold;
    providing wireless power when the amount of charging minutes for the customer is above a threshold; and
    debiting the amount of the charging minutes.

20. The method of claim 19, wherein the amount is debited as the wireless power is provided.

21. The method of claim 19, wherein the charging minutes comprise mobile device minutes from a wireless agreement for usage of the mobile device.

22. The method of claim 19, wherein the request includes encrypted account information, including the identity of the consumer and the amount of the charging minutes, wherein the method is further comprising
- decrypting the identity of the consumer and the amount of the charging minutes; and
- verifying the identity by submitting a message to the consumer on a mobile device.

23. A method for wirelessly providing power to a device comprising:
- detecting the device when within range of a wireless power source;
- identifying the device upon detection and identifying an account associated with the device;
- authorizing a payment for providing wireless power to the device;
- delivering the wireless power to the device;
- receiving, from the device, a confirmation of receipt of the wireless power, wherein the confirmation includes an amount of wireless power received; and
- adjusting the payment when the amount of wireless power in the confirmation is different from the wireless power delivered.

24. The method of claim 23 wherein the payment is reduced when the amount of wireless power in the confirmation is less that the wireless power delivered.

25. The method of claim 23 wherein the confirmation comprises a physical containment of the device.

26. The method of claim 23 wherein the authorizing a payment comprises:
- communication an amount of fees for the payment of the wireless power; and
- requesting a validation of the amount of fees, wherein the validation comprises a wireless acknowledgement of the payment fees.

* * * * *